(12) United States Patent
Wilson

(10) Patent No.: US 10,028,518 B2
(45) Date of Patent: Jul. 24, 2018

(54) SYSTEM AND METHOD FOR STERILIZING FOOD PRODUCTS

(71) Applicant: Robert B. Wilson, Overland Park, KS (US)

(72) Inventor: Robert B. Wilson, Overland Park, KS (US)

( * ) Notice: Subject to any disclaimer, the term of this patent is extended or adjusted under 35 U.S.C. 154(b) by 0 days.

(21) Appl. No.: 14/951,008

(22) Filed: Nov. 24, 2015

(65) Prior Publication Data

US 2016/0143342 A1 May 26, 2016

Related U.S. Application Data

(60) Provisional application No. 62/083,690, filed on Nov. 24, 2014.

(51) Int. Cl.
*A23L 3/01* (2006.01)
*A23L 3/015* (2006.01)
*A23L 3/00* (2006.01)

(52) U.S. Cl.
CPC .............. *A23L 3/01* (2013.01); *A23L 3/0155* (2013.01); *A23L 3/003* (2013.01); *Y02P 60/85* (2015.11)

(58) Field of Classification Search
CPC .................................. A23L 3/01; A23L 3/0155
See application file for complete search history.

(56) References Cited

U.S. PATENT DOCUMENTS

| 5,277,869 A * | 1/1994 | Glazer | A61L 11/00 241/17 |
| 7,104,184 B2 * | 9/2006 | Biderman | A47J 31/40 99/282 |
| 7,297,113 B1 * | 11/2007 | Russell | A61B 5/145 600/302 |
| 2004/0006486 A1 * | 1/2004 | Schmidt | G06Q 30/06 726/6 |
| 2004/0191374 A1 * | 9/2004 | Weng | A23L 3/0155 426/238 |
| 2005/0260311 A1 * | 11/2005 | Garwood | A23B 4/16 426/480 |
| 2006/0185372 A1 * | 8/2006 | Conde Hinojosa | A23L 3/36 62/64 |

(Continued)

*Primary Examiner* — Regina M Yoo
(74) *Attorney, Agent, or Firm* — Kutak Rock LLP; Bryan P. Stanley

(57) ABSTRACT

The systems and methods of the present invention provide an economically feasible means of thermally processing items such as food products. In some embodiments, the thermal process is a pasteurization process. In other embodiments, the thermal process is a sterilization process. The thermal process utilizes a volumetric heating process to quickly and efficiently add heat energy to the item and then utilizes a surface heating process to obtain a relatively even, highly elevated, temperature throughout the item. In this way, the time required to perform various thermal processes, such as pasteurization and/or sterilization, is greatly reduced compared with traditional processes while still being more reliable and more predictable than other recently developed processes. Furthermore, the system and method is less complicated and more efficient than other systems and processes currently known. Furthermore still, the method includes spraying fluid onto a surface of the item to reduce edge heating.

15 Claims, 4 Drawing Sheets

(56) References Cited

U.S. PATENT DOCUMENTS

| | | | |
|---|---|---|---|
| 2006/0278093 A1* | 12/2006 | Biderman | A47J 31/40 99/282 |
| 2013/0183749 A1* | 7/2013 | Aamodt | A61L 9/14 435/287.1 |
| 2013/0240507 A1* | 9/2013 | Kimrey, Jr. | H05B 6/70 219/702 |
| 2013/0240508 A1* | 9/2013 | Kimrey, Jr. | H05B 6/70 219/702 |
| 2013/0240510 A1* | 9/2013 | Kimrey, Jr. | H05B 6/70 219/762 |
| 2013/0240511 A1* | 9/2013 | Kimrey, Jr. | H05B 6/70 219/762 |
| 2013/0240512 A1* | 9/2013 | Kimrey, Jr. | H05B 6/70 219/762 |
| 2013/0240513 A1* | 9/2013 | Kimrey, Jr. | H05B 6/70 219/762 |
| 2013/0240514 A1* | 9/2013 | Kimrey, Jr. | H05B 6/70 219/762 |
| 2013/0240515 A1* | 9/2013 | Kimrey, Jr. | H05B 6/70 219/762 |
| 2013/0240516 A1* | 9/2013 | Kimrey, Jr. | H05B 6/70 219/762 |
| 2013/0240517 A1* | 9/2013 | Kimrey, Jr. | H05B 6/70 219/762 |
| 2013/0240518 A1* | 9/2013 | Kimrey, Jr. | H05B 6/70 219/762 |
| 2013/0243560 A1* | 9/2013 | Kimrey, Jr. | H05B 6/70 414/805 |
| 2016/0309549 A1* | 10/2016 | Kimrey, Jr. | H05B 6/70 |

* cited by examiner

SYSTEM AND METHOD FOR STERILIZING FOOD PRODUCTS

CROSS-REFERENCE TO RELATED APPLICATIONS

This application claims priority pursuant to 35 U.S.C. 119(e) to U.S. Provisional Patent Application Ser. No. 62/083,690, filed Nov. 24, 2014, the entire disclosure of which is incorporated herein by reference.

FIELD OF THE INVENTION

The present invention relates generally to systems and methods of heating and/or sterilizing objects. More particularly, the present invention relates to a system and method of using volumetric heating and retort processes to pasteurize and/or sterilize food products.

BACKGROUND OF THE INVENTION

Numerous harmful microorganisms can be found in and on various food products. If untreated, these microorganisms can cause food to spoil prematurely and/or can cause sickness and even death. To increase the shelf life of food and decrease risks to consumers, many food products are pasteurized and/or sterilized ("Heat Sterilization"). In some instances, Heat Sterilization extends the shelf life of food products such that even otherwise perishable food products can be safely stored at room temperature for long periods of time ("shelf-stable").

Heat Sterilization involves heating food products to a sufficient temperature (typically 80° C. to 100° C. for pasteurization and 100° C. to 140° C. for sterilization) and maintaining the food products at that temperature for a sufficient amount of time to kill harmful microorganisms. The time versus temperature relationship is based on a logarithmic scale such that a small increase in sterilization temperature has a significant impact on sterilization time. For instance, sterilizing a food product at 100° C. can take up to 200 hours while sterilizing the same food product at 115° C. or 122° C. may only require 6 hours or 6 minutes, respectively. In addition to the obvious benefits, minimizing sterilization time maximizes taste and nutrient retention while reducing the risk of physical damage to the food product.

Traditionally, Heat Sterilization was accomplished with heated air ("Dry Heat Sterilization") and/or with heated vapors or fluids ("Wet Heat Sterilization") using conventional heating methods of conduction and/or convection ("Surface Heat Sterilization"). More recently, volumetric heating (i.e. heating with energy waves such as microwaves or radio waves) has been used to sterilize food products ("Volumetric Heat Sterilization"). Each method has its advantages and disadvantages.

Boiling is a simple example of Wet Heat Sterilization. Unfortunately, boiling has various limitations. For instance, the boiling process prevents the Wet Heat Sterilization process from exceeding the boiling point of the boiling fluid (i.e. 100° C. for water). Because the sterilization temperature is so low, the sterilization time is very long. Additionally, to protect sterilized food from new microorganisms, Heat Sterilization is often accomplished while the food product is enclosed in an air-tight package. During the boiling process, the packaging and the air in the packaging heat up and expand. During the cooling process, the packaging cools faster than the air inside the packaging. Consequently, as the packaging shrinks, the internal pressure increases even more, sometimes causing the packaging to burst.

Retort Sterilization, which involves heat and pressurization, solves some of the problems associated with boiling. Because Retort Sterilization involves pressure, the boiling temperature of the fluid is increased. This increases the sterilization temperature, thereby decreasing the required sterilization time. Additionally, the ability to control the pressure in the system can be utilized to prevent the packaging from bursting. U.S. Publication Number 2013/0071546, the entire disclosure of which is incorporated herein by reference, describes Retort Sterilization and other sterilization processes in further detail.

Although Retort Sterilization is a superior process compared with other conventional sterilization processes, the Retort Sterilization process is still a Surface Heat Sterilization process that can take several hours to complete. Recently, work has been done to utilize Volumetric Heating to sterilize food products. Volumetric Heating is capable of simultaneously heating the entire volume of a food product. U.S. Pat. No. 7,119,313, U.S. Pat. No. 8,586,899, and U.S. Publication Number 2014/0083820, the entire disclosures of which are incorporated herein by reference, describe Volumetric Heating and other sterilization processes in more detail.

Volumetric Heating drastically reduces the amount of time necessary to sterilize products, in some cases decreasing the energy required to sterilize the product and/or increasing the shelf life, taste, and/or nutritional value of the sterilized food product. Unfortunately, Volumetric Heating is expensive and complex. Additionally, various other problems have prevented Volumetric Heating from becoming commercially successful.

Volumetric Heating can be unpredictable. For instance, it is difficult or impossible to predict how energy waves will flow through a particular food product, making it difficult or impossible to predict how thoroughly a food product will be heated. To reduce some of this uncertainty, systems of the prior art have been forced to use microwave emitters that emit microwaves at 915 megahertz ("MHz") rather than the more readily available microwave emitters that emit microwaves at 2450 MHz because microwaves at 915 MHz generally heat more thoroughly than do microwaves at 2450 MHz. Furthermore, systems of the prior art have been forced to use single mode microwave systems rather than multimode microwave systems. Furthermore still, some systems of the prior art require the use of water and/or other fluids to reduce uncertainty by decreasing a phenomenon known as "edge heating." Unfortunately, while solving some problems, these solutions create additional problems. For instance, U.S. Pat. No. 7,119,313 teaches filling a cavity of a container with a fluid, placing a food product in the cavity such that it is submerged in the fluid, pressurizing the cavity, and propagating microwaves at 915 MHz into the cavity of the container so as to heat the food product and the liquid ("Volumetric Retort Sterilization"). Unfortunately, the temperature of the fluid is elevated to such that its ability to reduce edge heating is minimized. Additionally, as the temperature of a liquid such as water approaches the temperature of the liquid's latent heat of evaporation, Volumetric Heating becomes less effective and even less predictable. Consequently, it would be beneficial to have a more predictable system and method of utilizing Volumetric Heating to pasteurize and/or sterilize food products.

SUMMARY OF THE INVENTION

An object of the instant invention is to provide a system and/or method of thermally processing items by utilizing volumetric heating to quickly and efficiently increase the temperature of the food products and utilizing surface heating processes to more reliably and more predictably complete the thermal process.

Unlike systems and methods of the prior art, the volumetric heating process and the surface heating process of the present invention are separate and distinct processes. This provides several advantages over the prior art. For instance, utilizing a volumetric heating process separate from a surface heating process allows for the use of evaporative cooling as a more effective means of combatting edge heating during the volumetric heating process. Furthermore, referencing FIG. 3, utilizing volumetric heating to essentially preheat the item drastically reduces the amount of time necessary to thermally process the item compared with the amount of time necessary to thermally process the item using more traditional surface heating processes alone. In fact, the amount of time necessary to sterilize a food product using the system and method of the present invention is nearly the same as the amount of time necessary to sterilize the food product using the volumetric heating of the prior art. The system and methods of the present invention, however, are more efficient, less complicated, more predictable, and more reliable than the volumetric heating systems and methods of the prior art. Consequently, the system and methods of the present invention are more useful and commercially viable than the systems and methods of the prior art.

The foregoing and other objects are intended to be illustrative of the invention and are not meant in a limiting sense. Many possible embodiments of the invention may be made and will be readily evident upon a study of the following specification and accompanying drawings comprising a part thereof. Various features and subcombinations of invention may be employed without reference to other features and sub combinations. Other objects and advantages of this invention will become apparent from the following description taken in connection with the accompanying drawings, wherein is set forth by way of illustration and example, an embodiment of this invention and various features thereof.

BRIEF DESCRIPTION OF THE DRAWINGS

A preferred embodiment of the invention, illustrative of the best mode in which the applicant has contemplated applying the principles, is set forth in the following description and si show in the drawings and is particularly and distinctly pointed out and set forth in the appended claims.

DETAILED DESCRIPTION OF A PREFERRED EMBODIMENT

Figure 1:
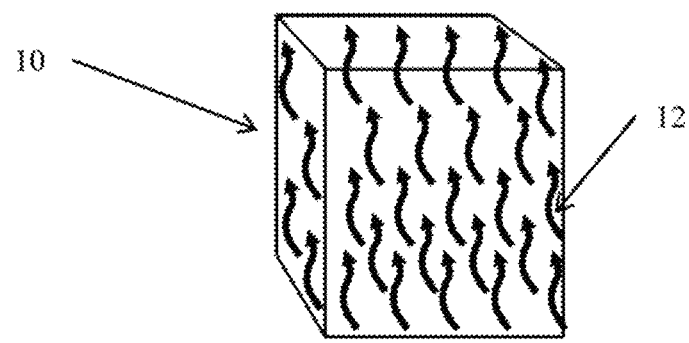
FIG. 1 is a visual representation of volumetric heating showing energy waves migrating through a food product.
Figure 2:
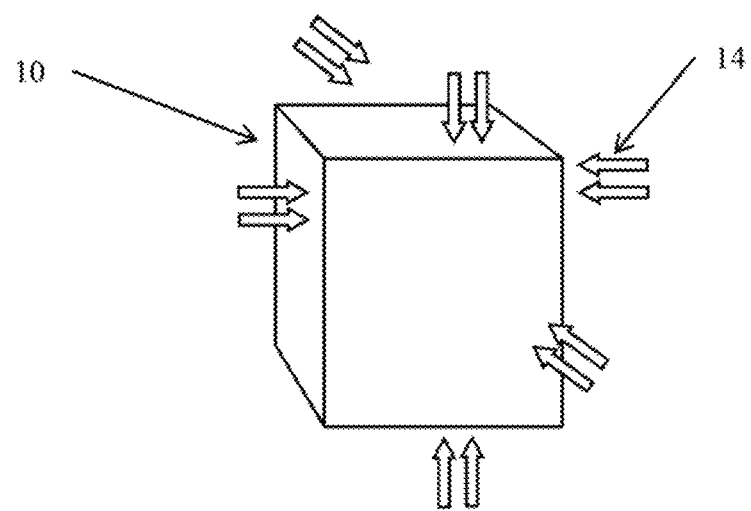
FIG. 2 is a visual representation of conventional heating showing heat energy being directed towards a plurality of surfaces of a food item.

As required, a detailed embodiment of the present invention is disclosed herein; however, it is to be understood that the disclosed embodiment is merely exemplary of the principles of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The present invention is directed to a system for and method of thermally processing food products. More specifically, the present invention is directed to a system for and a method of utilizing volumetric heating to quickly and efficiently increase the temperature of food products 10 and utilizing retort sterilization processes to more reliably and more predictably complete the thermal process.

In an embodiment of the present invention, energy waves 12 are directed towards a food product to excite the molecules of the food product, thereby adding heat energy to the food product and increasing the temperature of the food product ("Volumetric Heating"). In some such embodiments, the energy waves 12 are microwaves (microwave heating). In other such embodiments, the energy waves 12 are radio waves ("RF" heating). The Volumetric Heating process continues to heat the food product until the temperature of at least a portion of the food product approaches, reaches, and/or exceeds a first target temperature. In some embodiments, the first target temperature is the latent heat of evaporation of a fluid, such as water. In other embodiments, the first target temperature is associated with a thermal process such as a pasteurization process and/or sterilization process. In some such embodiments, the first target temperature is a pasteurization temperature and/or a sterilization temperature.

In some embodiments, the food product 10 is a packaged food product that is placed in a sealable container prior to and/or during the Volumetric Hearting process. In other embodiments, the food product 10 is moved into a sealable container after the Volumetric Heating process is complete.

Upon completion of the Volumetric Heating process, a surface heating process, such as a Retort Sterilization process, is utilized to finish the thermal process by directing heat energy 14 towards one or more surface of the food product 10, thereby further influencing the temperature of the food product 10. In some embodiments, the surface heating process adds additional heat energy to the food product, thereby increasing the average temperature of the food product as it approaches the second target temperature. In other embodiments, the surface heating process removes heat energy from the food product so as to allow the average temperature of the food product to slowly decrease as the temperature within the food product becomes more evenly distributed. In still other embodiments, the surface heating process maintains the level of heat energy within the food product such that the average temperature of the food product is maintained as the temperature within the food product becomes more evenly distributed.

In some embodiments, the surface heating process is utilized to cause the food product to obtain a relatively consistent temperature that is relatively equivalent to a second target temperature. In some such embodiments, the surface heating process substantially maintains the food product at or near the second target temperature for a pre-determined period of time. In some embodiments, the second target temperature is proportional to and/or equivalent to the first target temperature. In other embodiments, the pre-determined period of time is equivalent to a required period of pasteurization time and/or sterilization time at the second target temperature. In some such embodiments, the pre-determined period of time is influenced by properties of the food product, by the environment within which the food product is heated, and/or other factors associated with the process, including, but not limited to, factors associated with the amount of time the food product was at an elevated temperature prior to the food product reaching the second temperature and/or how quickly the food will be allowed to cool.

In a preferred embodiment, the system of the present invention includes first 100 and second 200 housings and a support structure for supporting the first and second housings. Each housing defines an interior area, with the first housing defining a first interior area 102 and the second housing defining a second interior area 202. The first housing 100 and first interior area 102 are configured to accommodate volumetric heating. The second housing 200 and the second interior area 202 are configured to accommodate surface heating.

In some embodiments, the first housing 100 includes power emitters 110, such as microwave and/or radio frequency emitters, that are configured to emit energy waves into the first interior area 102 so as to enable adding heat energy to items that are placed within the first interior area. In some such embodiments, at least some of the power emitters are microwave emitters that are configured to emit microwaves at 2,450 megahertz. In other such embodiments, at least some of the power emitters are microwave emitters that are configured to emit multimode microwaves.

In some embodiments, the second housing 200 is configured to maintain a high pressure, high temperature environment within the second interior area 202. In some embodiments, the second housing 200 includes one or more heating element 210 and is configured to hold a volume of fluid 50 within the second interior area 202 such that the heating elements 210 are capable of adding heat energy to the volume of fluid 50 so as to increase and/or maintain the temperature of the volume of fluid. In some such embodiments, the second housing 200 further includes insulation so as to reduce the amount of heat energy that is allowed to escape from the second interior area 202. In other such embodiments, the heating elements 210 are capable of heating the fluid to the boiling temperature of the fluid. In some such embodiments, the second housing 200 is pressure sealed such that as the fluid boils, pressure within the second interior area 202 increases.

In some embodiments, the system of the present invention includes a hollow column 300 extending from the second housing 200. The hollow column defines opposed first 310 and second 320 openings and an interior area 302 extending between said first 310 and second 320 openings. In some such embodiments, the second housing 200 defines a first opening in communication with the second opening of the hollow column. In this way, the system defines a first passageway 230 into the second interior area 202.

In some embodiments, the first passageway 230 is configured so as to allow food items 10 to be moved into the second interior area 202 through the first passageway 230. In some such embodiments, the system includes a conveyor for conveying the food items through the first passageway 230.

In other embodiments, the hollow column 300 is configured to hold fluid within its interior area 302. In this way, the fluid within the hollow column 300 is capable of creating a pressure seal for the first passageway 230. In some embodiments, the hollow column is configured to hold a sufficient height of a fluid such that the pressure seal created by the fluid is sufficient to withstand the differential of the pressure at the first opening 310 of the hollow column and the pressure within the second interior area 202. For instance, in some such embodiments, the hollow column is configured to hold a column of water that is at least tall enough to overcome two atmospheres of pressure in the second internal area 202 when the external pressure at the first opening 310 of the hollow column 300 is one atmosphere.

In some embodiments, the system of the present invention includes a hollow tube 400 extending from the second housing 200. The hollow tube 400 defines opposed first 410 and second 420 openings and an interior area 402 extending between said first 410 and second 420 openings. In some such embodiments, the second housing 200 defines a second opening in communication with the first opening 410 of the hollow tube 400. In this way, the system defines a second passageway 240 into the second interior area 202.

In some embodiments, the second passageway 240 is configured such that food items 10 within the second interior area 202 can be removed from the second interior area 202 through the second passageway 240. In some such embodiments, the system includes a conveyor for conveying the food items through the second passageway 240.

In other embodiments, the hollow tube 400 is configured to hold fluid within its interior area 402. In this way, the fluid within the hollow tube 400 is capable of creating one or more pressure seal for the second passageway 240.

Figure 3:
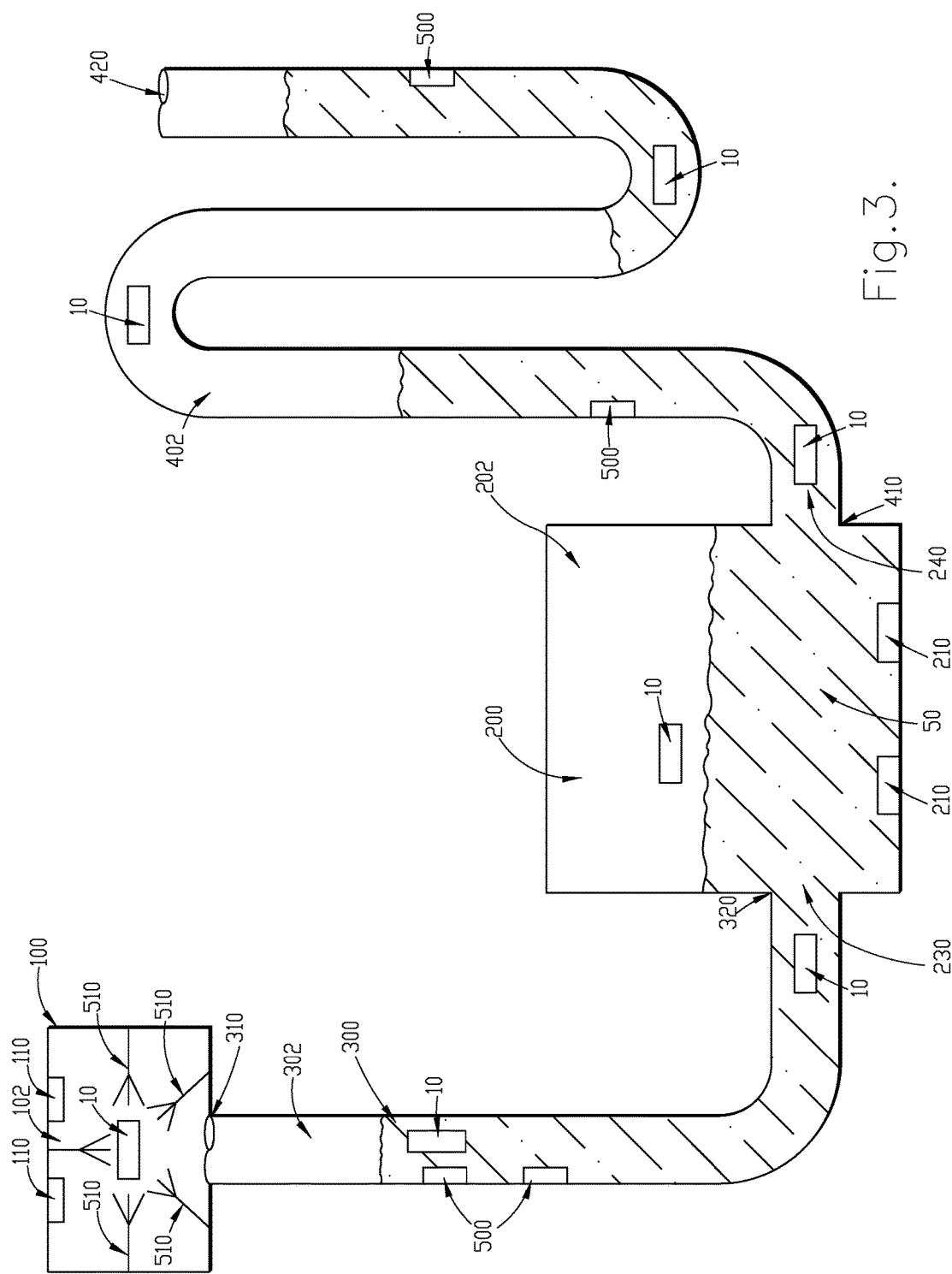
FIG. 3 is a schematic drawing of a system of the present invention.

FIG. 3 shows an embodiment of a hydrostatic system that includes the hollow column 300 and hollow tube 400 features discussed above and designed to hold fluid and convey the food items 10 through the system of the inventive concept. In some embodiments, heating elements and/or cooling systems (along with appropriate sensors and control systems) 500 are integrated into the column 300 and/or hollow tube 400 to maintain desired temperature of the fluid as items 10 travel through the system. In some embodiments, the fluid temperature is maintained at a desired temperature within the tube 400 to continue the heating, retort, pasteurization and/or sterilization processes for at least a pre-determined period of time.

In some embodiments, the hollow tube 400 has a serpentine configuration. In some such embodiments, the serpentine configuration is oriented vertically such that the food item travels predominantly up and down inside of the hollow tube 400 as it travels from the first opening 410 of the hollow tube 400 towards the second opening 420 of the hollow tube 400. In other embodiments, the serpentine configuration is oriented horizontally such that the food item travels predominantly side to side inside of the hollow tube 400 as it travels from the first opening 410 of the hollow tube 400 towards the second opening 420 of the hollow tube 400.

Figure 4:
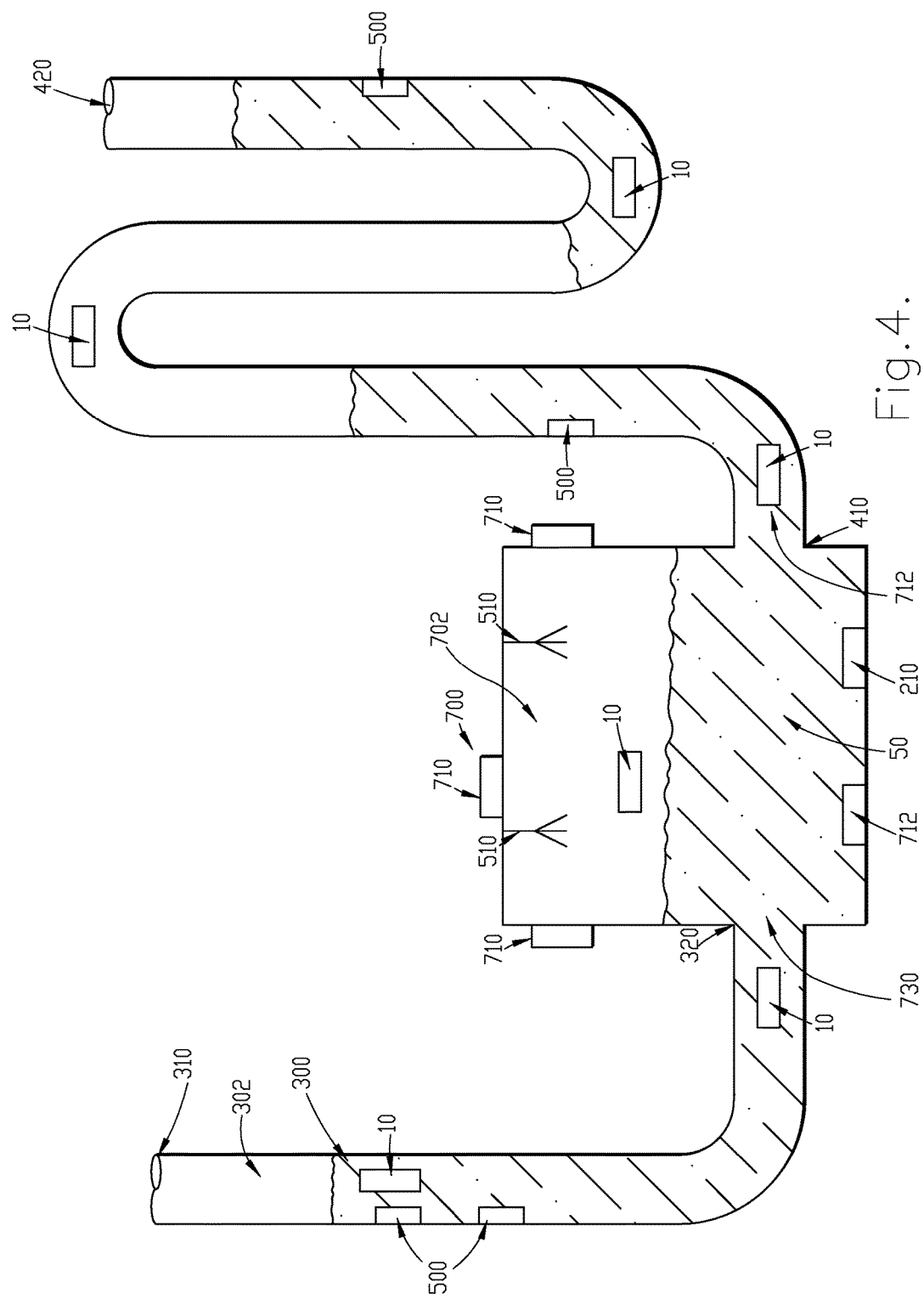
FIG. 4 is a schematic drawing of a different system of the present invention.

Referring to FIG. 4, another preferred embodiment of the present invention includes a pressure vessel 700 and a support structure for supporting the pressure vessel. The pressure vessel 700 defines an interior area 702 that is configured to accommodate volumetric heating and surface heating. In some embodiments, the interior area 702 is configured to hold a volume of fluid and a volume of air that is positioned above the volume of fluid. In some such embodiments, the system is configured to accommodate volumetric heating of an item at least when the item is positioned in the volume of air. In other such embodiments, the system is configured to accommodate surface heating of an item at least when the item is positioned in the volume of fluid.

In some embodiments, the pressure vessel 700 includes power emitters 710, such as microwave and/or radio frequency emitters, that are configured to emit energy waves into the interior area 702 so as to enable adding heat energy to items 10 that are positioned within the interior area 702. In some such embodiments, at least some of the power emitters are microwave emitters that are configured to emit microwaves at 2,450 megahertz. In other such embodiments, at least some of the power emitters are microwave emitters that are configured to emit multimode microwaves.

In some embodiments, the pressure vessel 700 is configured to maintain a high pressure, high temperature environment within the interior area 702. In some embodiments, the pressure vessel 700 includes one or more heating element 712 and is configured to hold a volume of fluid 50 within the interior area 702 such that the heating elements 712 are capable of adding heat energy to the volume of fluid 50 so as to increase and/or maintain the temperature of the volume of fluid. In some such embodiments, the pressure vessel 700 further includes insulation so as to reduce the amount of heat energy that is allowed to escape from the interior area 702. In other such embodiments, the heating elements 712 are capable of heating the fluid to the boiling temperature of the fluid. In some such embodiments, the pressure vessel 700 is pressure sealed such that as the fluid boils, pressure within the interior area 702 increases.

In some embodiments, the system of the present invention includes a hollow column 300 extending from the pressure vessel 700. The hollow column defines opposed first 310 and second 320 openings and an interior area 302 extending between said first 310 and second 320 openings. In some such embodiments, the pressure vessel 700 defines a first opening in communication with the second opening of the hollow column. In this way, the system defines a first passageway 730 into the interior area 702 of the pressure vessel 700.

In some embodiments, the first passageway 730 is configured so as to allow food items 10 to be moved into the interior area 702 through the first passageway 730. In some such embodiments, the system includes a conveyor for conveying the food items through the first passageway 730.

In other embodiments, the hollow column 300 is configured to hold fluid within its interior area 302. In this way, the fluid within the hollow column 300 is capable of creating a pressure seal for the first passageway 730. In some such embodiments, the hollow column is configured to hold a sufficient height of a fluid such that the pressure seal created by the fluid is sufficient to withstand the differential of the pressure at the first opening 310 of the hollow column and the pressure within the interior area 702 of the pressure vessel 700. For instance, in some such embodiments, the hollow column is configured to hold a column of water that is at least tall enough to overcome two atmospheres of pressure in the interior area 702 when the external pressure at the first opening 310 of the hollow column 300 is one atmosphere.

In some embodiments, the system of the present invention includes a hollow tube 400 extending from the pressure vessel 700. The hollow tube 400 defines opposed first 410 and second 420 openings and an interior area 402 extending between said first 410 and second 420 openings. In some such embodiments, the pressure vessel 700 defines a second opening in communication with the first opening 410 of the hollow tube 400. In this way, the system defines a second passageway 740 into the interior area 702 of the pressure vessel 700.

In some embodiments, the second passageway 740 is configured such that food items 10 within the interior area 702 can be removed from the interior area 702 of the pressure vessel 700 through the second passageway 740. In some such embodiments, the system includes a conveyor for conveying the food items through the second passageway 740.

In other embodiments, the hollow tube 400 is configured to hold fluid within its interior area 402. In this way, the fluid within the hollow tube 400 is capable of creating one or more pressure seal for the second passageway 740.

Some embodiments of the present invention further include an integrated control system for controlling and/or monitoring the system of the present invention. In some such embodiments, an input device is used to provide specific control instructions for a particular food product and/or for a particular thermal process. For instance, in some embodiments the input device provides the control system with information pertaining to pasteurization and/or sterilization temperature, pasteurization and/or sterilization pressure, and/or pasteurization and/or sterilization time for a particular food product. In other such embodiments, an output device is used to provide a physical and/or digital report of various parameters, including but not necessarily limited to pasteurization and/or sterilization temperature, pasteurization and/or sterilization pressure, and/or pasteurization and/or sterilization time. Some such parameters may assist in determining whether the thermal process meets requirements established by the Food and Drug Administration ("FDA") and/or any other requirements or guidelines whether imposed by a regulatory agency, a customer, or otherwise.

In still other embodiments, a mist of fluid 510, such as water, is sprayed on the food product 10 during the Volumetric Heating process and/or during the surface heating process, thereby introducing evaporative cooling so as to reduce or eliminate the risk of "edge heating." In some such embodiments, the timing, amount, temperature, and/or location of the sprayed fluid are controlled by an integrated control system based on a pre-program and/or readings received. In some embodiments, sensors are associated with the integrated control system to provide various readings that are interpreted by the control system to determine when misting (or other "cooling") action should be taken. In some such embodiments, visual sensors are utilized to provide readings regarding amount of expansion of a package in which the food (or other items being processed) are located during the thermal process. In other embodiments, temperature sensors are utilized to provide temperature readings of or near the items being processed during the thermal process. In other embodiments, a user controls the spraying (or other "cooling") function. In some embodiments, the "cooling" function comprises reducing the amount of heating power and/or discontinuing heating for a period of time.

Figure 5:
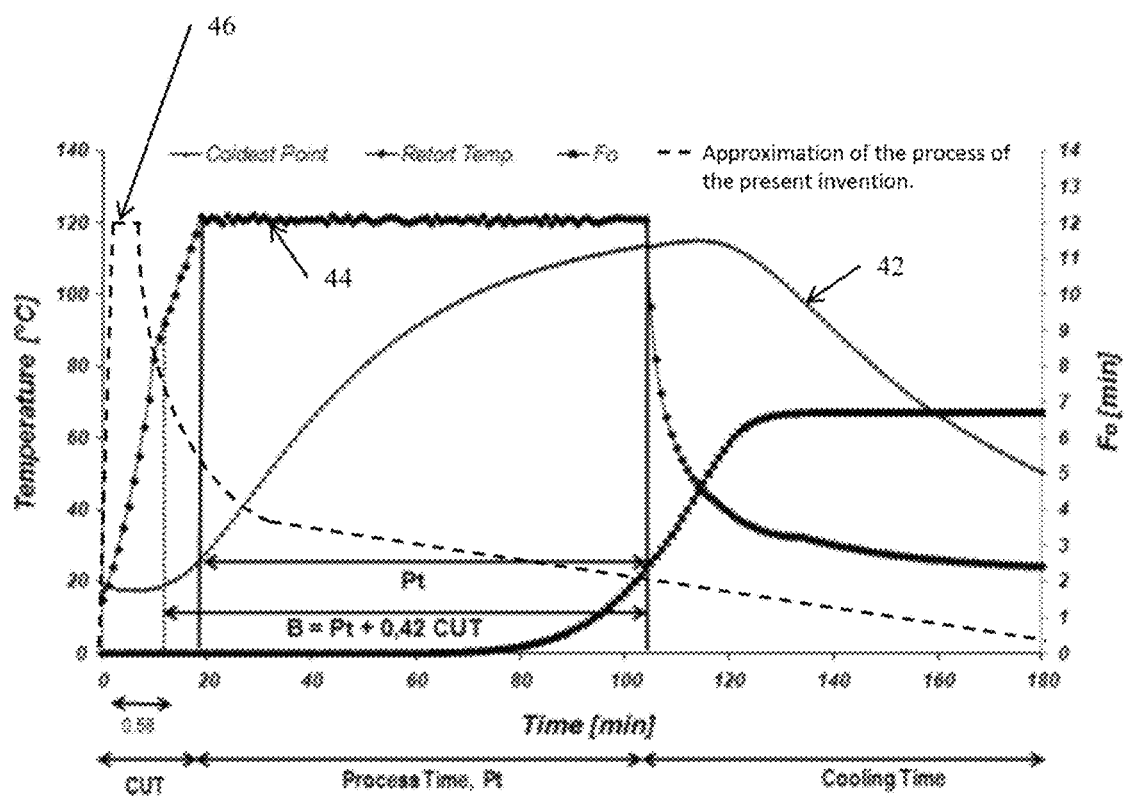
FIG. 5 shows a graphical representation of an approximation of the process of the present invention overlaid on a ball curve showing a graphical representation of a standard retort sterilization process.

FIG. 5 is a chart showing a graphical representation of a standard retort sterilization process. A first curve 42 represents the coldest point of the food item during the standard retort process and a second curve 44 represents the corresponding retort temperature. As can be seen in FIG. 5, it takes a significant amount of time before the coldest point within the item approaches the retort temperature. Consequently, the retort temperature must be maintained at a high level for a long period of time, resulting in other portions of the food product being maintained at a high temperature for a long period of time.

FIG. 5 also includes a third curve 46 that is a graphical representation of an approximation of the process of the present invention. As can be seen, because the food product temperature is initially elevated in a volumetric heating process, the retort temperature need only be elevated for short period of time, thereby drastically reducing the amount of time the food product is required to be maintained at a high temperature.

It will be appreciated that the foregoing examples of thermally processing food items are representative of just some applications of the various embodiments of the present invention. Other applications include thermally processing various other objects, including sterilizing items such as medical devices, infusion bags, and/or any other object for which sterilization is desired and/or required. In some embodiments, the system and method described above is utilized as an alternative to retort/autoclave systems and methods for sterilizing non-metal medical devices In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the inventions is by way of example, and the scope of the inventions is not limited to the exact details shown or described.

Although the foregoing detailed description of the present invention has been described by reference to an exemplary embodiment, and the best mode contemplated for carrying out the present invention has been shown and described, it will be understood that certain changes, modification or variations may be made in embodying the above invention, and in the construction thereof, other than those specifically set forth herein, may be achieved by those skilled in the art without departing from the spirit and scope of the invention, and that such changes, modification or variations are to be considered as being within the overall scope of the present invention. Therefore, it is contemplated to cover the present invention and any and all changes, modifications, variations, or equivalents that fall within the true spirit and scope of the underlying principles disclosed and claimed herein. Consequently, the scope of the present invention is intended to be limited only by the attached claims, all matter contained in the above description and shown in the accompanying drawings shall be interpreted as illustrative and not in a limiting sense.

Having now described the features, discoveries and principles of the invention, the manner in which the invention is constructed and used, the characteristics of the construction, and advantageous, new and useful results obtained; the new and useful structures, devices, elements, arrangements, parts and combinations, are set forth in the appended claims.

It is also to be understood that the following claims are intended to cover all of the generic and specific features of the invention herein described, and all statements of the scope of the invention which, as a matter of language, might be said to fall therebetween.

What is claimed is:

1. A method of thermally processing an item, the method comprising:
    utilizing a volumetric heating process to increase the temperature of at least a portion of the item to at least a first target temperature;
    utilizing a surface heating process to influence the temperature of the item by submerging the item in a volume of heated fluid so as to cause the item to obtain a relatively consistent temperature, the relatively consistent temperature being relatively equivalent to a second target temperature; and
    spraying a mist of fluid on the item during the volumetric heating process,
    wherein the volumetric heating process is accomplished, at least partially, when the item is not submerged in the heated fluid.

2. The method of claim 1, wherein the surface heating process further increases the average temperature of the item.

3. The method of claim 1, wherein the surface heating process is capable of maintaining the temperature of the item at or above the second target temperature for a sufficient amount of time so as to complete the thermal process.

4. The method of claim 1, wherein the thermal process is a sterilization process.

5. The method of claim 1, wherein the item is a food product and the thermal process is a pasteurization process.

6. The method of claim 1, wherein the volumetric heating process is a microwave heating process.

7. The method of claim 6, wherein the microwave heating process is accomplished utilizing microwave emitters that emit microwaves at 2,450 megahertz.

8. The method of claim 6, wherein the microwave heating process is accomplished utilizing a multimode microwave system.

9. The method of claim 1, further comprising:
    loading control instructions for processing the item onto an input device; and
    utilizing the input device to provide the control instructions to a system, the system being configured to implement the control instructions so as to sterilize the item.

10. The method of claim 9, wherein the control instructions include information pertaining to at least one of temperature, pressure, and time.

11. The method of claim 9, wherein the control instructions include information pertaining to a variety of different items.

12. The method of claim 1, further comprising:
    obtaining during a thermal process information pertaining to one or more parameters;
    storing the information in a database; and
    utilizing a computer processor to generate one or more report for at least one of the one or more parameters,
    wherein the thermal process is at least one of the volumetric heating process and the surface heating process.

13. The method of claim 12, wherein at least one of the one or more parameters is one of time, temperature, and pressure.

14. The method of claim 12, further comprising:
    storing requirements for sterilizing the item in said database;
    utilizing the computer processor to determine whether the thermal process has met or exceeded the requirements; and
    adjusting the thermal process based on the determination.

15. A method of thermally processing an item, the method comprising:
    utilizing a volumetric heating process to increase the temperature of at least a portion of the item to at least a first target temperature;
    utilizing a surface heating process to influence the temperature of the item by submerging the item in a volume of heated fluid so as to cause the item to obtain a relatively consistent temperature, the relatively consistent temperature being relatively equivalent to a second target temperature,
    wherein the volumetric heating process is accomplished, at least partially, when the item is not submerged in the heated fluid, and wherein the surface heating process maintains portions of the item at or above the first target temperature while the temperature of other portions of the item are elevated to or above the second target temperature.

* * * * *